(12) United States Patent
Teufel et al.

(10) Patent No.: US 9,404,782 B2
(45) Date of Patent: Aug. 2, 2016

(54) USE OF TRANSDUCERS WITH A PIEZO CERAMIC ARRAY TO IMPROVE THE ACCURACY OF ULTRA SONIC METERS

(71) Applicant: Honeywell International Inc., Morristown, NJ (US)

(72) Inventors: Michael Teufel, Kraichtal (DE); Bas Kastelein, Butzbach (DE)

(73) Assignee: Honeywell International, Inc., Morris Plains, NJ (US)

( * ) Notice: Subject to any disclaimer, the term of this patent is extended or adjusted under 35 U.S.C. 154(b) by 68 days.

(21) Appl. No.: 14/519,785

(22) Filed: Oct. 21, 2014

(65) Prior Publication Data

US 2016/0109272 A1    Apr. 21, 2016

(51) Int. Cl.
*H01L 41/00*    (2013.01)
*G01F 1/66*    (2006.01)

(52) U.S. Cl.
CPC ............ *G01F 1/668* (2013.01); *G01F 1/662* (2013.01)

(58) Field of Classification Search
CPC .................................................... H01L 41/00
USPC ................................. 310/334, 339, 316.01
See application file for complete search history.

(56) References Cited

U.S. PATENT DOCUMENTS

| | | | |
|---|---|---|---|
| 3,741,014 A | 6/1973 | Tamura | |
| 4,460,841 A * | 7/1984 | Smith | B06B 1/0622 310/334 |
| 6,263,551 B1 * | 7/2001 | Lorraine | B06B 1/0622 29/25.35 |
| 6,720,712 B2 * | 4/2004 | Scott | G06K 9/0002 310/316.01 |
| 6,950,768 B2 | 9/2005 | Freund, Jr. et al. | |
| 8,011,083 B2 | 9/2011 | Straub, Jr. et al. | |
| 8,302,455 B2 | 11/2012 | Straub, Jr. | |
| 8,485,046 B2 | 7/2013 | Lansing et al. | |
| 2002/0047500 A1 * | 4/2002 | Lai | B06B 1/0622 310/334 |
| 2003/0073906 A1 * | 4/2003 | Flesch | B06B 1/0622 600/459 |
| 2006/0272417 A1 | 12/2006 | Zanker et al. | |
| 2011/0162461 A1 | 7/2011 | Allen | |
| 2011/0314932 A1 | 12/2011 | Straub, Jr. et al. | |
| 2012/0060623 A1 | 3/2012 | Lansing et al. | |
| 2013/0327155 A1 | 12/2013 | Drachmann | |

FOREIGN PATENT DOCUMENTS

| | | |
|---|---|---|
| CN | 203519119 U | 4/2014 |
| EP | 2 000 784 A1 | 12/2008 |
| EP | 2 602 596 A1 | 6/2013 |

OTHER PUBLICATIONS

Piezo ceramics | Piezoelectric materials | Piezoceramic | PZT | P . . . , http://www.noliac.com/Materials-38.aspx, printed Oct. 7, 2014, 1 page.

* cited by examiner

*Primary Examiner* — Jewel V Thompson
(74) *Attorney, Agent, or Firm* — Kermit D. Lopez; Luis M. Ortiz; Ortiz & Lopez, PLLC

(57) ABSTRACT

An ultrasonic meter includes a group of piezoelectronic ceramic arrays, wherein each array comprises array stripes, such that a signal associated with each array can be split and a required phase shaft added to the signal to obtain simultaneously different data from the signal such as, for example, the transit time of a direct path and crosstalk. The smaller array can provide a higher aperture and improve the use of crosstalk.

20 Claims, 2 Drawing Sheets

USE OF TRANSDUCERS WITH A PIEZO CERAMIC ARRAY TO IMPROVE THE ACCURACY OF ULTRA SONIC METERS

FIELD OF THE INVENTION

Embodiments are related to ultrasonic meters, including, for example, ultrasonic flow meters for measuring and monitoring liquid and gas. Embodiments further relate to transducers and piezoelectronic elements and components.

BACKGROUND

Ultrasonic meters are employed in a number of applications and industries for measuring fluid flow. One area where ultrasonic meters find particular usefulness is in the oil and gas industries. After hydrocarbons are removed from the ground, for example, the fluid stream (e.g., crude oil, natural gas) is transported from place-to-place via pipelines. It is thus desirable to know with accuracy the amount of fluid flowing through a pipeline, and particular accuracy is demanded when the fluid changes hands or is subject to a "custody transfer."

Ultrasonic flow meters, for example, may be used to measure the amount of fluid flowing in a pipeline, and ultrasonic flow meters have sufficient accuracy to be used in custody transfer. The value of gas "changing hands" at the point of custody transfer in a high volume natural gas pipeline may amount to a million dollars or more in a single day. For this reason, manufacturers attempt to make ultrasonic meters that are not only very accurate, but also reliable in the sense that the mean time between failures is large.

Thus, any advance which increases the reliability of ultrasonic meters, and/or which decreases the time to troubleshoot and repair time after an ultrasonic meter has failed, would provide a competitive advantage in the marketplace.

To improve the accuracy of ultrasonic meters, the use of several paths to cover more information across the entire cross-section of, for example, a pipeline is advantageous. Mostly the paths are selected due to the Gauβ—integration method, which results in fixed positions and weighting values for each path. It is well known that a crosstalk between different paths can be used to increase the number of originally designed paths. Unfortunately, these additional paths are usually not at the right position to increase the knots of the Gauβ method.

Applying velocity profile descriptions such as potential-law or log-law may overcome this limitation and an exact integration along the reconstructed velocity distribution may result in a higher accuracy as the simple Gauβ method. There are other limitations as well, due to a rather weak propagation of ultra sound in natural gas, normal disc piezo elements are used generating a rather strong beam perpendicular to the piezo plane. The beam aperture of these transducers is rather small. Therefore, a crosstalk between the individual paths is very weak and rarely not applicable for the general measuring range.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide an improved ultrasonic meter.

It is another aspect of the disclosed embodiments to provide for an improved ultrasonic meter that uses piezoelectric ceramic arrays.

It is yet another aspect of the disclosed embodiments to provide for the splitting of signals from arrays with the addition of a required phase shift to simultaneously obtain different sets of information from a single signal.

The aforementioned aspects and other objectives and advantages can now be achieved as described herein. An ultrasonic meter can be implemented, which includes piezoelectric ceramic arrays, wherein each array includes array stripes, such that a signal associated with each array can be split and a required phase shift added to the signal to obtain simultaneously different data from the signal such as, for example, the transit time of a direct path and crosstalk. The smaller array strips can provide a higher aperture and improve the use of crosstalk.

The piezoelectronic ceramic array(s) can be arranged to include a first sender and a second sender and a first receiver and a second receiver, wherein each of the first and second senders and the first and second receivers comprise a plurality of array stripes, wherein signals are sent to the first receiver from the first sender and the second sender simultaneously and a correct phase shift between at least some stripes among the plurality of array stripes allows for a split of the signals. With such an arrangement, an individual signal code can be reconstructed from the signals. The simultaneous measurement and a detection of different signals from the first sender and the second sender results in a faster and less energy consuming measurement mode.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Example embodiments will now be described more fully hereinafter with reference to the accompanying drawings, in which illustrative embodiments of the invention are shown. The example embodiments disclosed herein can be embodied in many different forms and should not be construed as limited to the example embodiments set forth herein; rather, these example embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Figure 1:
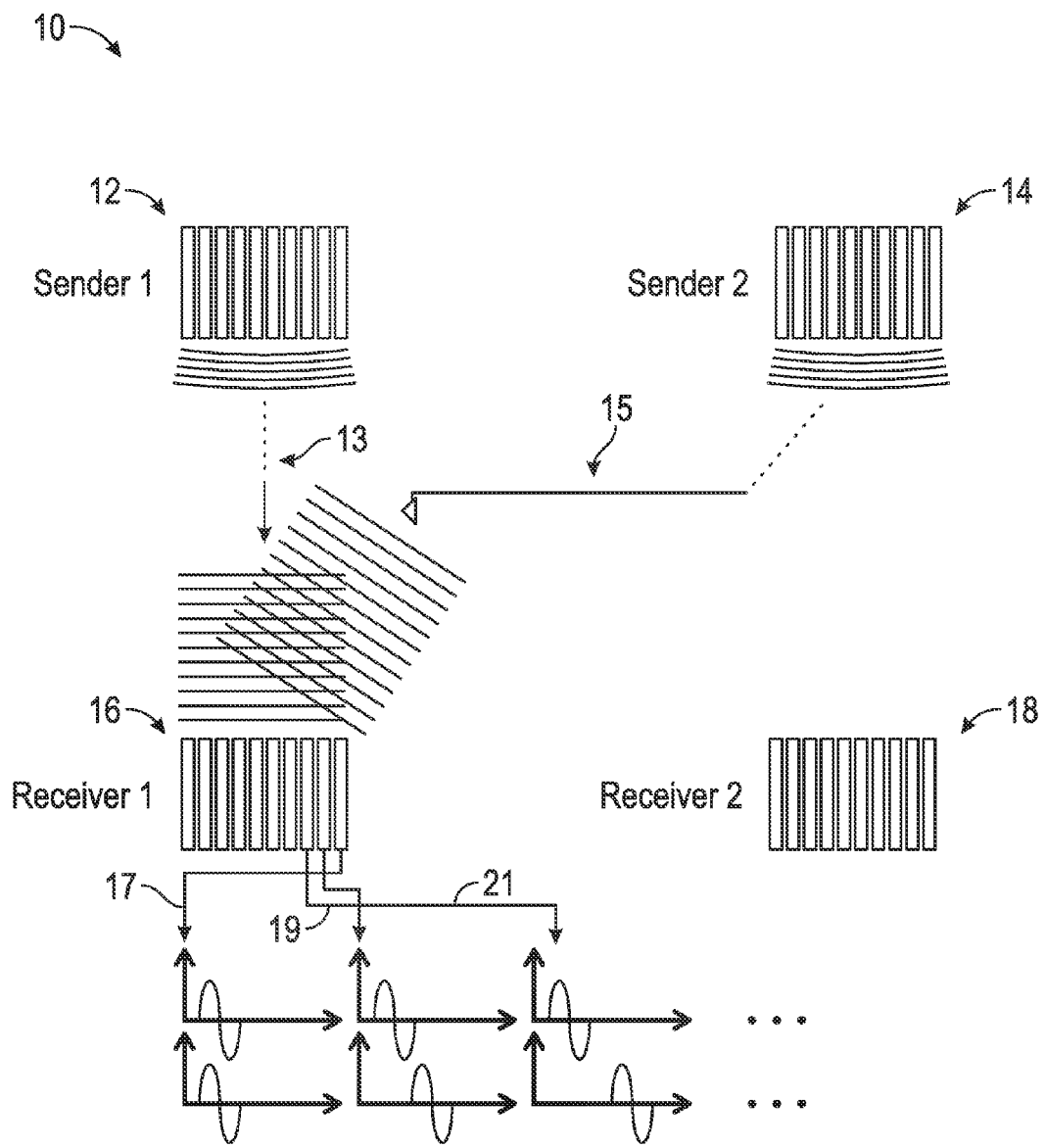
FIG. 1 illustrates a schematic diagram of an ultrasonic meter which uses transducers with a piezoelectronic ceramic array, in accordance with a preferred embodiment.

FIG. 1 illustrates a schematic diagram of an ultrasonic meter 10, which uses transducers with a piezoelectronic ceramic array composed of a plurality of piezoelectric elements, in accordance with a preferred embodiment. In the arrangement shown in FIG. 1, signals may be sent to a first receiver 16 from senders 12 and 14 simultaneously. Applying the correct phase shift between the array stripes (depending on the angle and distance) can allow for a split of the signals and an individual signal code can be reconstructed. The simultaneous measurement and detection of different signals from senders 12 and 14 (or even more senders) may result in a faster and less energy consuming measurement mode. The same principle may work at the same time for the second receiver 18.

The senders 12, 14 and the receivers 16, 18 are preferably configured from piezoelectric material, and in particular, piezoelectric or piezoelectronic ceramics, which offer the property of developing an electric charge when mechanical stress is exerted on them. In these materials, an applied electric field produces a proportional strain. The electrical response to mechanical stimulation is referred to as the direct piezoelectric effect, and the mechanical response to electrical stimulation is referred to as the converse piezoelectric effect. Piezoelectric ceramics are usually divided into two groups. The antonyms "hard" and "soft" doped piezoelectric ceramics refer to the ferroelectric properties, i.e., the mobility of the dipoles or domains and hence also to the polarization/depolarization behavior.

Figure 2:
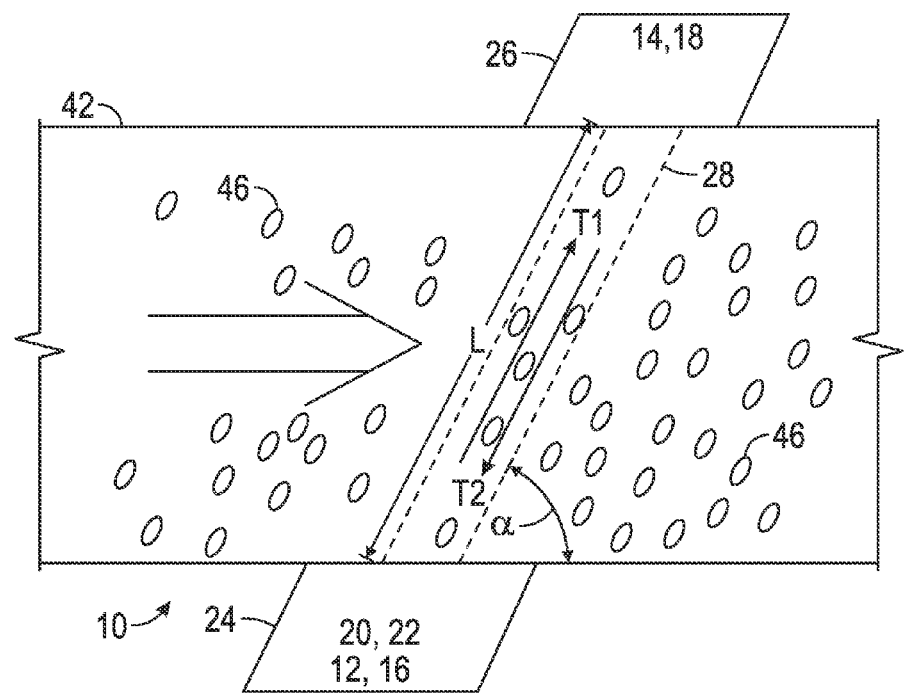
FIG. 2 illustrates an example of an ultrasonic meter for measuring flow, in accordance with an alternative embodiment.

FIG. 2 illustrates an example of a system for measuring flow utilizing the ultrasonic meter shown in FIG. 1, in accordance with an alternative embodiment. In the example shown in FIG. 2, it can be assumed that the ultrasonic meter 10 is an ultrasonic flow meter. FIG. 1 depicts a section through a piping 42 indicating a flow direction A of the flowing gas 46. In this example a pair of ultrasonic transducers 24, 26 can be disposed on opposite sides of the piping 42 and separated by a path 28 having a length L which is inclined at an angle to the flow direction A of the piping 42. Each ultrasonic transducer 24, 26 include, respectively, the ultrasonic sender 12 and the ultrasonic receiver 16.

On activation of electronics 44 (e.g., see FIG. 3) associated with the ultrasonic transducers 24, 26, the first transducer 24 can transmit an ultrasonic signal, which can then be received by the receiver 18 of the second transducer 26. In a similar manner when the electronics 44 of the second transducer 26 are activated, an ultrasonic pulse can be transmitted along the path 28 and subsequently received by the first transducer 24. Once these propagation times have been measured using the ultrasonic transducers 24, 26 and processed via electronics 44 (see below) associated with the ultrasonic flow meter 10, the propagation times of the ultrasonic pulses transmitted by the respective ultrasonic transducers 24, 26 can be employed to calculate the flow velocity for the gas 46 present in the piping 42.

The senders 12, 14 and receivers 16, 18 are preferably implemented as piezoelectronic ceramic arrays, with each array 12, 14 and receivers 16, 18 having a plurality of array stripes. Adjusting the right phase shift between the array stripes allows for a change in the main direction of the ultrasonic beam and permits the received signal to be significantly improved in strength and quality. The smaller array stripes will offer a significant higher aperture that will further improve the use of crosstalk. On the other side of the path 28, the beam intensity in the "normal forward" direction may be weaker. Signal processing both for sending and receiving may be more complex, depending upon devices and components used.

Figure 3:
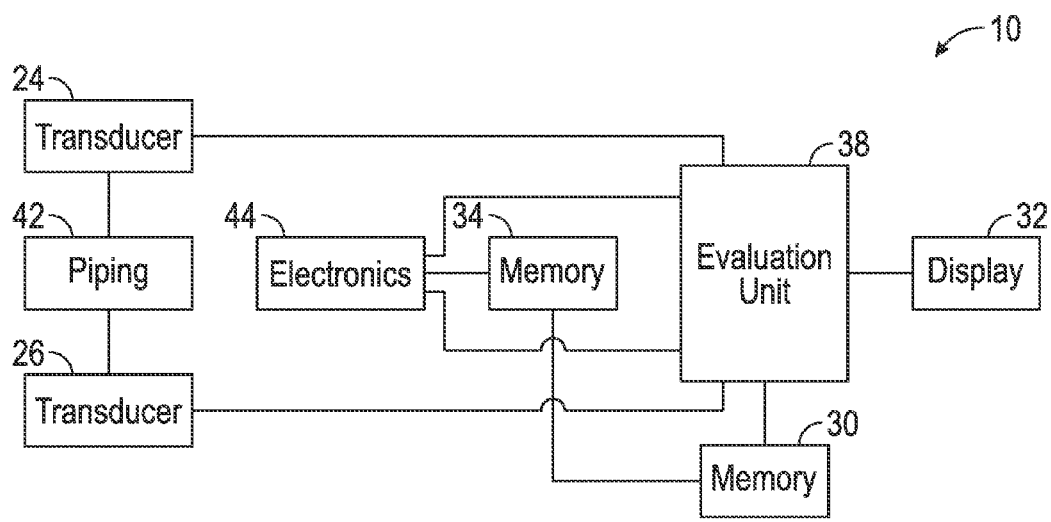
FIG. 3 illustrates a block diagram of an ultrasonic meter for measuring flow including transducers and associated electronics, in accordance with an alternative embodiment.

FIG. 3 illustrates a block diagram of the ultrasonic meter 10 shown in FIG. 1-2, in accordance with an alternative embodiment. The ultrasonic meter 10 generally includes one or more transducers 24, 26 in contact with the piping 42. The transducers can communicate electronically with an evaluation unit 38, which in turn can communicate electronically with a memory (e.g., a computer memory) and a display 32. An additional memory 34 can communicate with electronics 44 and the evaluation unit 38.

Signals from the transducers 24, 26 can be input into the evaluation unit 38 for the calculation of the gas flow velocity in the piping 42. The analysis of the gas flow velocity in the piping 42, however, follows the arrangement shown in FIG. 1. That is, the signals from the arrays 12, 14, 16, 18 can be split and the required phase shift added to obtain simultaneously two sets of data from a single signal, along with transit time information (e.g., velocity) of the direct path 28 and crosstalk. Such an arrangement may be particularly useful for disturbed, asymmetric velocity profiles, while allowing for correct and faster averaging demands for simultaneous measurement of all paths, including, for example, path 28 depicted in FIG. 2.

Note that in some embodiments a test procedure for testing the transducers 24, 26 and respective arrays 12, 16 and 14, 18 can be stored and/or incorporated into memory 30 connected to the evaluation unit 38, so that only one memory may be present in the ultrasonic gas flow meter depending upon the embodiment (e.g., an alternative embodiment). In some embodiments, this memory 30 can be implemented on the same circuit board and within the same housing as the evaluation unit 38. The same is true for the electronics 44 and other components and circuits.

The evaluation unit 38 can advantageously also include a counter (not shown) which initiates a self-test of, for example, the electronics 44, the evaluation unit 38 itself, and other electronics associated with the ultrasonic gas flow meter 10 at intermittent time intervals to monitor if some or all of the electronic components are still working correctly. The evaluation unit 38 can calculate the gas flow velocity in dependence of, for example, measured propagation times.

Based on the foregoing, it can be appreciated that a number of embodiments, preferred and alternative, are disclosed. For example, in one embodiment, an ultrasonic meter can be disclosed that includes a plurality of piezoelectronic ceramic arrays, wherein each array among the plurality of piezoelectronic ceramic arrays comprises a plurality of array stripes, wherein a signal associated with each array is split and a required phase shift added to the signal to obtain simultaneously different data from the signal including at least a transit time of a direct path and crosstalk. In some embodiments, the smaller array stripes among the plurality of array stripes can provide a higher aperture and improves the use of the crosstalk. The transmit time generally includes velocity data.

In another example embodiment, an evaluation unit can be employed, which communicates with the plurality of piezoelectronic ceramic arrays. In yet another embodiment, at least one memory can be employed, which communicates with the evaluation unit and electronics associated with the plurality of piezoelectronic arrays. In still another example embodiment, signals from the plurality of piezoelectronic ceramic arrays can be input to the evaluation unit for a calculation of the signal and a determination of the flow velocity of gas within a piping in contact with the plurality of piezoelectronic ceramic arrays.

In another example embodiment, an ultrasonic meter can be implemented, which includes at least one piezeoelectronic ceramic array comprising a first sender and a second sender and a first receiver and a second receiver, wherein each of the first and second senders and the first and second receivers comprise a plurality of array stripes, wherein signals are sent to the first receiver from the first sender and the second sender simultaneously and a correct phase shift between at least some stripes among the plurality of array stripes allows for a split of the signals.

In another example embodiment, an individual signal code is capable of being reconstructed from the signals. In still another embodiment, a simultaneous measurement and a detection of different signals from the first sender and the second sender can result in a faster and less energy consuming measurement mode.

In yet another example embodiment, an ultrasonic meter method can be implemented, which includes the steps of configuring a plurality of piezoelectronic ceramic arrays, wherein each array among the plurality of piezoelectronic ceramic arrays comprises a plurality of array stripes; splitting a signal associated with each array; and adding a required phase shift to the signal to obtain simultaneously different data from the signal including at least a transit time of a direct path and crosstalk.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An ultrasonic meter, comprising:
a plurality of piezoelectronic ceramic arrays, wherein each array among said plurality of piezoelectronic ceramic arrays comprises a plurality of array stripes, wherein a signal associated with each array is split and a required phase shift added to said signal to obtain simultaneously different data from said signal including at least a transit time of a direct path and crosstalk.

2. The ultrasonic meter of claim 1 wherein smaller array stripes among said plurality of array stripes provide a higher aperture and improves the use of said crosstalk.

3. The ultrasonic meter of claim 1 wherein said transit time comprises a velocity.

4. The ultrasonic meter of claim 1 further comprising an evaluation unit that communicates with said plurality of piezoelectronic ceramic arrays.

5. The ultrasonic meter of claim 4 further comprising at least one memory that communicates with said evaluation unit and electronics associated with said plurality of piezoelectronic arrays.

6. The ultrasonic meter of claim 2 further comprising an evaluation unit that communicates with said plurality of piezoelectronic ceramic arrays and at least one memory that communicates with said evaluation unit and electronics associated with said plurality of piezoelectronic arrays.

7. The ultrasonic meter of claim 4 wherein signals from said plurality of piezoelectronic ceramic arrays are input to said evaluation unit for a calculation of said signal and determining a gas flow velocity of gas within a piping in contact with said plurality of piezoelectronic ceramic arrays.

8. An ultrasonic meter, comprising:
at least one piezeoelectronic ceramic array comprising a first sender and a second sender and a first receiver and a second receiver, wherein each of said first and second senders and said first and second receivers comprise a plurality of array stripes, wherein signals are sent to said first receiver from said first sender and said second sender simultaneously and a correct phase shift between at least some stripes among said plurality of array stripes allows for a split of said signals.

9. The ultrasonic meter of claim 8 wherein an individual signal code is capable of being reconstructed from said signals.

10. The ultrasonic meter of claim 8 wherein a simultaneous measurement and a detection of different signals from said first sender and said second sender results in a faster and less energy consuming measurement mode.

11. The ultrasonic meter of claim 8 further comprising an evaluation unit that communicates with said at least one piezeoelectronic ceramic array.

12. The ultrasonic meter of claim 11 further comprising at least one memory that communicates with said evaluation unit and electronics associated with said at least one piezeoelectronic ceramic array.

13. The ultrasonic meter of claim 9 further comprising an evaluation unit that communicates with said at least one piezeoelectronic ceramic array and at least one memory that communicates with said evaluation unit and electronics associated with said at least one piezeoelectronic ceramic array.

14. An ultrasonic meter method, comprising:
configuring a plurality of piezoelectronic ceramic arrays, wherein each array among said plurality of piezoelectronic ceramic arrays comprises a plurality of array stripes;
splitting a signal associated with each array; and
adding a required phase shift to said signal to obtain simultaneously different data from said signal including at least a transit time of a direct path and crosstalk.

15. The method of claim 14 wherein smaller array stripes among said plurality of array stripes provide a higher aperture and improves the use of said crosstalk.

16. The method of claim 14 wherein said transit time comprises a velocity.

17. The method of claim 14 further comprising providing an evaluation unit that communicates with said plurality of piezoelectronic ceramic arrays.

18. The method of claim 17 further comprising providing at least one memory that communicates with said evaluation unit and electronics associated with said plurality of piezoelectronic arrays.

19. The method of claim 15 further comprising providing an evaluation unit that communicates with said plurality of piezoelectronic ceramic arrays and at least one memory that communicates with said evaluation unit and electronics associated with said plurality of piezoelectronic arrays.

20. The method of claim 14 wherein signals from said plurality of piezoelectronic ceramic arrays are input to said evaluation unit for a calculation of said signal and determining a gas flow velocity of gas within a piping in contact with said plurality of piezoelectronic ceramic arrays.

* * * * *